United States Patent [19]

Schmitt

[11] Patent Number: 4,672,733
[45] Date of Patent: Jun. 16, 1987

[54] METHOD OF MAKING A SHAFT SEAL RING

[75] Inventor: Wilhelm Schmitt, Heppenheim, Fed. Rep. of Germany

[73] Assignee: Firma Carl Feudenberg, Weinheim, Fed. Rep. of Germany

[21] Appl. No.: 738,682

[22] Filed: May 28, 1985

Related U.S. Application Data

[63] Continuation of Ser. No. 531,221, Sep. 9, 1983, abandoned.

[30] Foreign Application Priority Data

Dec. 14, 1982 [DE] Fed. Rep. of Germany ....... 3246152

[51] Int. Cl.⁴ .................... F16J 15/00; B29C 65/56
[52] U.S. Cl. ..................................... 29/511; 264/249; 264/250; 264/262; 264/334; 277/1; 425/DIG. 47
[58] Field of Search ............... 264/250, 322, 323, 265, 264/DIG. 67, 249, 259, 261, 262, 334; 425/DIG. 47; 29/469.5, 507, 512, 511, 513; 277/1

[56] References Cited

U.S. PATENT DOCUMENTS

| | | | |
|---|---|---|---|
| 2,127,982 | 8/1938 | Northup | 29/511 |
| 2,225,758 | 12/1940 | Stein | 29/511 |
| 2,263,815 | 11/1941 | Northup | 29/507 |
| 2,338,666 | 1/1944 | Nelson | 29/507 |
| 2,815,894 | 12/1957 | Herchert | 29/511 |
| 3,549,445 | 12/1970 | McMahon | 29/511 |
| 3,733,155 | 5/1973 | Burke | 264/DIG. 67 |
| 3,929,341 | 12/1975 | Clark | 29/511 |
| 3,939,551 | 2/1976 | Clark et al. | 29/511 |
| 4,155,153 | 5/1979 | Bainard et al. | 29/469.5 |
| 4,156,710 | 5/1979 | Carroll et al. | 264/322 |
| 4,320,568 | 3/1982 | Herrod et al. | 29/507 |
| 4,406,847 | 9/1983 | O'Neal et al. | 29/469.5 |

FOREIGN PATENT DOCUMENTS 0055656 7/1982 European Pat. Off. ............. 29/511

Primary Examiner—Jan H. Silbaugh
Assistant Examiner—Hubert P. Lorin
Attorney, Agent, or Firm—Felfe & Lynch

[57] ABSTRACT

A method of making a shaft seal ring starts with a tube, optionally provided on its outside and/or inside with hydrodynamically-acting return elements, as may be cut from a hollow cylinder. The tube is axially slipped along a form with a continuously increasing diameter until its leading or lower end is shaped into a flange in the radial direction. The flange may be simultaneously joined to a reinforcing ring.

12 Claims, 4 Drawing Figures

METHOD OF MAKING A SHAFT SEAL RING

This is a continuation of application Ser. No. 531,221, filed Sept. 9, 1983, now abandoned.

BACKGROUND OF THE INVENTION

The invention relates to a method of making a shaft seal ring wherein a ring-forming element is flared into the seal ring.

A method of this type is known from published German patent application DOS No. 24 60 185. There, the ring-forming element is cut from a thick-walled tube of polytetrafluoroethylene (PTFE), provided on one of its two axial boundary surfaces in the vicinity of the inner periphery with a hydrodynamically-acting return zone by cutting or stamping, and then turned out in this area so that a conical projection is produced. The wall thickness of the projection is thus reduced. As this is the area exposed to the abrasive action of the machine shaft which moves relative to it, this reduces the wear volume, and also results in poor flexibility for response to radial shaft oscillations. The turning operation also gives the molecular structure of the material at the dynamic return zone an orientation in the longitudinal direction which makes it difficult to achieve uniform contact pressures over long periods of time. Moreover, the production process does not lend itself to being atomated since production, shaping and mounting the sealing element in the reinforcing ring are difficult to accomplish, especially in a compact unit.

SUMMARY OF THE INVENTION

The object of the invention is to improve a method of the type described above in such a way that the drawbacks cited are no longer encountered. The method should be adapted to being automated in a space-saving manner and should permit the economical production of a shaft seal ring which comprises a sealing lip that hugs the shaft even in the presence of radial shaft oscillations and which, in the area exposed to the abrasive action of the machine shaft moving relative to it, has a greater wear volume.

In accordance with the invention, this object is accomplished in that the ring-forming element, optionally provided on the outside and/or the inside with a hydrodynamically-acting return element, is in the form of a hollow-cylinder, hose-like tube. The tube is axially slipped along a form with a trumpet-like continuously-increasing diameter until its leading or lower end is shaped into a flange terminating in the radial direction, generally, which may be simultaneously joined in a liquid-tight manner to a reinforcing ring.

The ring element may be produced from a tube or hollow cylinder made of any desired polymeric material suited for the purpose, for example, of rubber, PTFE, polyamide, or composite materials such as one or more of the materials named with a fiber content. With shaft diameters ranging from 5 to 220 mm, the wall thickness will be between 0.4 and 3 mm, and with larger shaft diameters the wall thickness may be as much as about 5 mm.

To provide the necessary contact pressure, the inside diameter of the hollow cylinder, and hence of the ring element, is made slightly smaller than the diameter of the shaft to be sealed. It is not possible to specify an exact diameter ratio since the elasticity of the material used, the occurrence of radial shaft oscillations, the pressure and temperature of the sealed medium as well as the coefficient of friction and the speed of rotation of the shaft are factors whose influences may mutually overlap. The ratio which is best in a given case therefore will have to be determined by trial and error, of which one skilled in the art is readily capable.

The use of secondary pressure elements, for example, garter springs, is optional. They should be allowed for in the pertinent calculations.

The ring element cut from the hollow cylinder may have the shape of a simple hose, that is to say, the shape of a thin-walled hollow cylinder which is bounded by surfaces that are parallel or perpendicular, respectively, to the axis of rotation. The axial length is always greater than the wall thickness.

For applications where a low-viscosity medium is to be sealed at a high rotative speed of the shaft, it has prooved advantageous to provide the tube in proximity to the sealing zone which is exposed to friction with hydrodynamic return elements for leakage liquid which may have seeped out under the sealing lip. These elements generally have the form of a helical groove produced by a stamping or cutting operation. In view of the thin wall of the tube and the resulting low mechanical resistance, it is much simpler to provide such a groove on the outer circumference than on the inner circumference. Providing the groove on the outer circumference thus is preferred even though it may then be necessary to turn the tube up before or after it has been joined to the reinforcing ring. The hollow cylindrical shape of the tube is not appreciably changed by providing it with hydrodynamically acting return elements.

To produce the desired shape, the tube is slipped onto and pushed forward on a form whose diameter increases like that of a trumpet in the forward direction. The end wall of the tube, initially perpendicular to the direction of advance, thus undergoes a deflection in the peripheral direction and finally forms the substantially coaxial boundary surface of a radially extending flange which serves to join the tube to the reinforcing ring. The surface areas of the completely shaped tube which are perpendicular and parallel to the axis of rotation pass smoothly into one another, with the result that the bending stresses acting on the profile in the presence of radial shaft oscillations are distributed over a large area. The result is uniform flexibility balanced over long periods of time.

The wall thickness of the surface areas extending parallel and perpendicular to the axis of rotation decreases uniformly outwardly in the radial direction so that, in proximity to the zone exposed to friction, a large wear volume is available. The relatively enlarged cross section in proximity to that zone makes it possible to obtain an optimum contact pressure while the relatively reduced cross section in the vicinity of the radially outward gripping zone results in improved flexibility. This enables the dynamically sealing part to follow the radial oscillations of the shaft particularly well.

The flangelike outwardly directed portion of the shaped tube can be secured to a reinforcing ring, optionally of multi-part construction, through a clamping joint, or can be secured through adhesive forces to a reinforcing ring made of a polymeric material or made integral with the tube. While in principle either of these possibilities may be made use of, reinforcing rings made of steel are frequently preferred in view of the occasionally high mechanical stresses encountered in automatic assembly.

BRIEF DESCRIPTION OF THE DRAWINGS

The method proposed in accordance with the invention will now be described in greater detail with reference to the accompanying drawings, wherein.

DETAILED DESCRIPTION OF THE INVENTION

Figure 1:
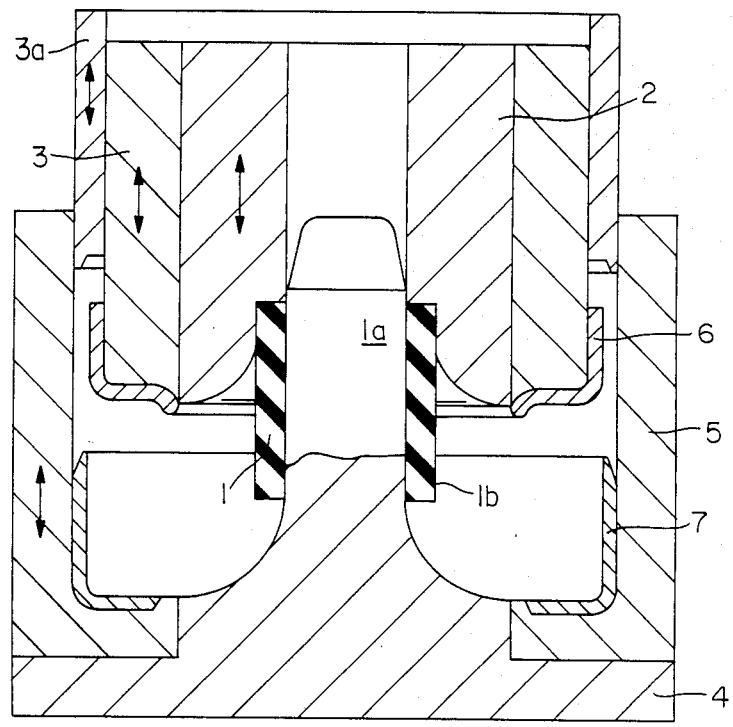
FIG. 1 shows an opened die in which the tube forming the ring element and the components of a two-part reinforcing ring have been inserted.

To produce a shaft seal ring by the proposed method, a tube 1 is provided or cut in a first operation (not shown) from a continuously extruded hose of a polymeric material. It may be provided either before or after the cutting operation with hydrodynamically-acting return elements, for example, by cutting or stamping one or more helical grooves into their inner and/or outer circumstances.

The inside diameter of the tube as produced is slightly smaller than the outside diameter of the shaft to be sealed. During the installation of the finished shaft seal ring, its sealing lip thus undergoes an elastic expansion which produces the contact pressure necessary to good sealing action. The use of secondary pressure elements, such as garter springs or a plurality of spring tongues distributed over the periphery, is optional.

The hose may be made of any material suited for the purpose. The preferred material is PTFE since it has a particularly low coefficient of friction and high temperature resistance and thus assures constant contact pressure of the sealing lip over long periods of time.

A PTFE tube suited for making a shaft seal ring for a shaft with a diameter of 85 mm, for example, will have a length of 12 mm, an inside diameter of 82 mm and an outside diameter of 84 mm. The end which, in the finished shaft seal ring, is in frictional contact with the sealed shaft, in other words the portion acting as the sealing lip, is provided on its inside with a helical groove with a depth of 0.4 mm and a pitch of 0.8 mm at an angle of 40 degrees.

The tube 1 is then inserted on a receiving end of a form 1a having a trumpet-like, continuously-increasing diameter in forming die when an upper die section is opened. The latter consists of a first die section 2 cooperative with the form and tube and a plunger 3 thereabout capable of independent advancement. The form 1a projects from a lower die section 4 with an associated ejector 5 which is adapted to be actuated independently thereof. The plunger is set back relative to the first die section and carries an inward-L-section inner ring 6 loosely set onto it. Loosely inserted in the ejector is an associated inward-L-section reinforcing ring component 7. The die is thus set up for shaping the tube 1 and joining it to the inner ring 6 and the reinforcing ring component 7.

This is initiated by coaxial, head-on movement of the upper die section 2 (but not plunger 3) toward the lower die section 4. The tube 1 thus undergoes a gradual, trumpet-like flaring of its lower, leading end 1b which terminates in the formation of a flange 9 projecting from the form between the radially-inward-L-sections of the inner ring 6 and the reinforcing ring 7.

Figure 2:
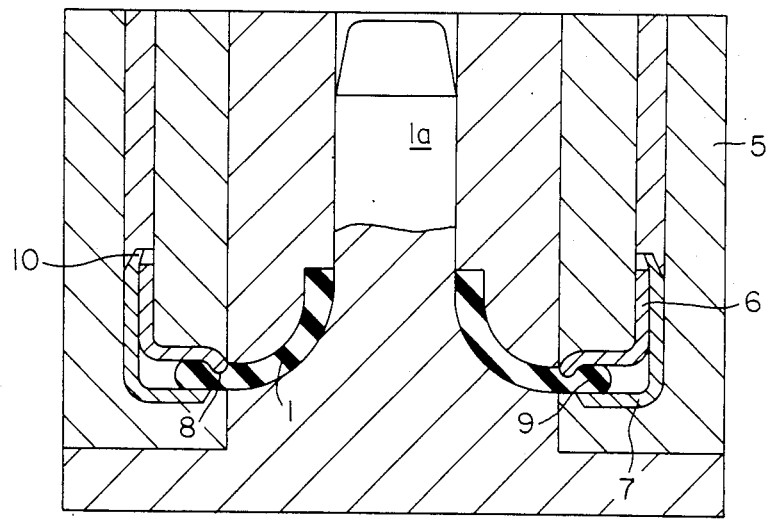
FIG. 2 shows the die of FIG. 1 in the closed state.

In the next operating step, the plunger 3 follows the preceding movement of the upper die section 2, thus forcing an inner peripheral bead 8 on the L-section of the inner ring 6 onto the flange 9. The flange is thus mechanically stabilized and sealed liquid-tight between the inner and reinforcing rings. The union is permanently stabilized by the simultaneous or subsequent crimping of the end 10 of the upward leg of the reinforcing ring 7 which extends beyond the corresponding end of the inner ring 6 with a connected or independently-actuatable crimping section 3a about the plunger 3 as shown in FIG. 2. The die can then be opened and the shaft seal ring withdrawn, for example by ejector 5, and used as intended.

Figure 3:
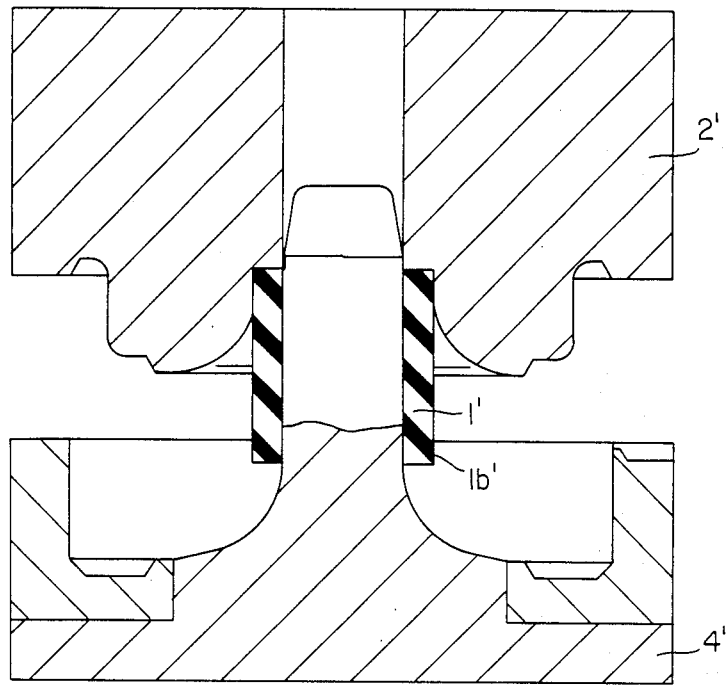
FIG. 3 shows a die similar to that of FIG. 1 in which only the tube forming the ring element has been inserted.
Figure 4:
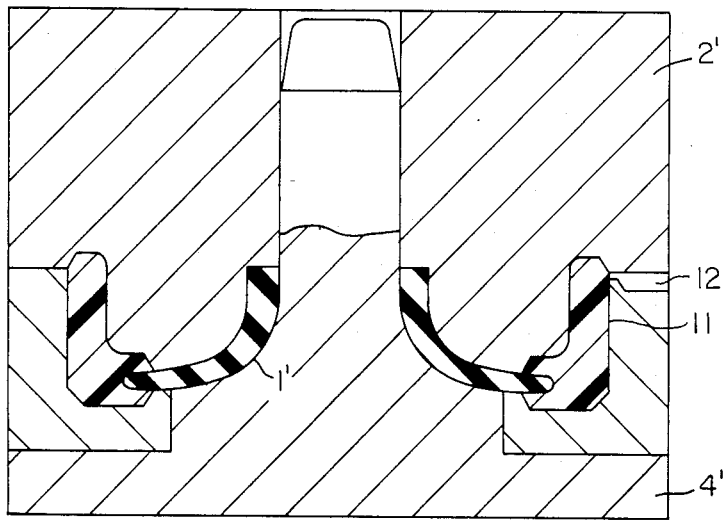
FIG. 4 shows the die of FIG. 3 in the closed state after a reinforcing ring made of a polymeric material has been made integral with the tube.

FIGS. 3 and 4 relate to the production of a shaft seal ring wherein the reinforcing ring is made of a polymeric material. The tube 1' is inserted in an opened die 2', 4' which generally corresponds to the preceding embodiment. The lower end 1b' of the tube has been subjected to a sodium-based caustic treatment to obtain good-bonding material for the reinforcing ring 11 which will be joined to it while liquefied.

During the coaxial head-on movement of the upper die section 2' toward the lower die section 4', the tube 1' undergoes at its lower end 1b' a trumpet-like enlargement of its diameter which terminates in the formation of a radial flange that protrudes into an annular hollow space enclosed by the upper and lower die sections 2', 4'. In keeping with the configuration of conventional reinforcing rings, said hollow space has an angular section. In an injection-molding operation through port 12, the hollow space is filled with liquid epoxy resin which, as it solidifies, forms a firm, integrating bond with the flange. The finished shaft seal ring may then be withdrawn and used as intended. The closed die and injected epoxy reinforcing ring are shown in FIG. 4.

It will be appreciated that the instant specification and claims are set forth by way of illustration and not of limitation, and that various changes and modifications may be made without departing from the spirit and scope of the present invention.

What is claimed is:

1. A method of making a shaft seal ring comprising:
   providing a hollow-cylinder, hose-like tube having a leading end, said tube being of an elastic material and said tube having a wall thickness and an axial length, said axial length being greater than the tube wall thickness;
   providing a form having an end portion receiving the tube which is substantially cylindrical and of constant diameter and a trumpet-shaped, continuously-increasing diameter portion curving outwardly on a non-interrupted smooth arc;
   slipping the tube along the form to cause a flow of the elastic material of the leading end of the tube in one direction until the leading end of the tube forms a flexible flange generally radially extending from the tube, the flange having a wall thickness less than that of the tube; and
   securing and mechanically stabilizing the radially extending flange between an inner ring and a reinforcing ring to form a shaft seal ring having a shaft gripping section and a flexible outwardly extending area gripping zone.

2. The method of claim 1 wherein:
the continuously-increasing diameter portion of the form is delimited so that the generally radial flange formed on the leading end of the tube projects beyond the said form portion.

3. The method of claim 2, and additionally comprising:
providing a first die section cooperative with the form, said form being in a lower die section;
providing an independently-advancable plunger about the first die section;
said inner and reinforcing rings having an inward -L-section;
providing the inward-L-section inner ring loosely set onto an end of the plunger on one side of the flange;
providing the inward-L section reinforcing ring component and means associated with the lower die section for receiving it on the other side of the flange from the plunger; and
slipping the tube along the form with the first die section to form the generally radial flange projecting from the form, and thereafter advancing the plunger along the first die section to mechanically stabilize and seal the flange liquid tight between the inward-L section of the inner ring and reinforcing ring component.

4. The method of claim 3, and additionally comprising:
providing the inner ring with an inner peripheral bead; and
providing a longer upward leg of the L-section on the reinforcing ring component than on the inner ring and crimping it over the corresponding upward leg end of the inner ring for permanently stabilizing the sealing of the flange between the inner ring and reinforcing ring component.

5. The method of claim 4, and additionally comprising providing a crimping section about the plunger for crimping the upward leg end of the reinforcing ring component over the corresponding end of the inner ring.

6. The method of claim 5, and additionally comprising connecting the crimping section to the plunger for movement therewith.

7. The method of claim 5 and additionally comprising providing the crimping section for movement independent of the plunger.

8. The method of claim 3 further comprising providing an ejector on the other side of the flange projecting from the form from the first die section and movable along the form in the other direction from the first die section for withdrawing the tube from the form after the flange is formed.

9. The method of claim 4, and additionally comprising providing an ejector on the other side of the flange projecting from the form from the first die section and movable along the form in the other direction from the first die section for withdrawing the tube from the form after the flange is formed.

10. The method of claim 5, and additionally comprising providing an ejector on the other side of the flange projection from the form from the first die section and movable along the form in the other direction from the first die section for withdrawing the tube from the form after the flange is formed.

11. The method of claim 6, and additionally comprising providing an ejector on the other side of the flange projection from the form from the first die section and movable along the form in the other direction from the first die section for withdrawing the tube from the form after the flange is formed.

12. The method of claim 7, and additionally comprising providing an ejector on the other side of the flange projection from the form from the first die section and movable along the form in the other direction from the first die section for withdrawing the tube from the form after the flange is formed.

* * * * *